(12) United States Patent
Furuichi et al.

(10) Patent No.: US 8,966,158 B2
(45) Date of Patent: Feb. 24, 2015

(54) DATA PROTECTION TECHNIQUE THAT PROTECTS ILLICIT COPYING OF DATA MAINTAINED IN DATA STORAGE

(75) Inventors: Sanehiro Furuichi, Kanagawa (JP); Masami Tada, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 47 days.

(21) Appl. No.: 13/324,901

(22) Filed: Dec. 13, 2011

(65) Prior Publication Data

US 2012/0151165 A1    Jun. 14, 2012

(30) Foreign Application Priority Data

Dec. 13, 2010    (JP) .................................. 2010-277503

(51) Int. Cl.
*G06F 12/00*    (2006.01)
*G06F 21/62*    (2013.01)

(52) U.S. Cl.
CPC .................................. *G06F 21/6218* (2013.01)
USPC ............................. 711/103; 711/104; 711/117

(58) Field of Classification Search
CPC .............................. G06F 12/14; G06F 12/0238
See application file for complete search history.

(56) References Cited

U.S. PATENT DOCUMENTS

| | | | |
|---|---|---|---|
| 2005/0283584 A1* | 12/2005 | Chen et al. | 711/170 |
| 2010/0228937 A1 | 9/2010 | Bae et al. | |

FOREIGN PATENT DOCUMENTS

| | | |
|---|---|---|
| JP | 2001229019 A | 8/2001 |
| JP | 2004234053 A | 8/2004 |
| JP | 2005258926 A | 9/2005 |
| JP | 2006285446 A | 10/2006 |
| JP | 2006344104 A | 12/2006 |
| JP | 2007156865 A | 6/2007 |
| JP | 2007207102 A | 8/2007 |
| JP | 2007280225 A | 10/2007 |
| JP | 2008059501 A | 3/2008 |
| JP | 2008287339 A | 11/2008 |
| JP | 2010102550 A | 5/2010 |
| JP | 2010225182 A | 10/2010 |
| JP | 2011150490 A | 8/2011 |
| WO | WO2008056410 A1 | 5/2008 |

OTHER PUBLICATIONS

Furuichi et al., "A Data Protection Technique that Protects Illicit Copying of Data Maintained in Data Storage," U.S. Appl. No. 13/453,472, filed Apr. 23, 2012, 43 pages.
Final Office Action, dated Mar. 14, 2014, regarding U.S. Appl. No. 13/453,472, 14 pages.
Office Action, dated Sep. 20, 2013, regarding U.S. Appl. No. 13/453,472, 26 pages.

* cited by examiner

*Primary Examiner* — Shawn X Gu
(74) *Attorney, Agent, or Firm* — Yee & Associates, P.C.; Jeffrey S. LaBaw

(57) ABSTRACT

A data protection program for protecting data to be processed by an application, and a computer including volatile storage means and nonvolatile storage means performs a volatile file unpack function of writing, to the nonvolatile storage means, data corresponding to a data file to be read or written by the application so that the data is associated with the data file; and a volatile file repackage function of outputting the data file corresponding to the data written to the volatile storage means.

8 Claims, 6 Drawing Sheets

DATA PROTECTION TECHNIQUE THAT PROTECTS ILLICIT COPYING OF DATA MAINTAINED IN DATA STORAGE

BACKGROUND

1. Field:

The present invention relates to a data protection program. In particular, the invention relates to a data protection program characterized by a configuration which protects data stored in storage means even when the computer terminates illegally.

2. Description of the Related Art

Information leakage and the like have become social issues.

Particularly, information leakage occurs when taking out digital data freely in requesting an overseas vendor or the like to perform update or the like of the digital data. Thus, how illegal copy of such digital data should be prevented has become an important challenge.

For example, when requesting a vendor to update digital data, it is conceivable to install security software into a PC of the vendor so that the digital data cannot be taken out freely. However, it is often difficult to request such PC setup. Further, even when a tool not requiring installation is used to set up the PC, the tool is avoided if it requires rebooting for execution.

It is also conceivable to deliver encrypted data. However, the data is decrypted when it is unpacked in the HDD. Accordingly, although the data can be protected in real time, it can be read when the PC terminates unexpectedly. As a result, data leakage cannot be prevented completely.

For these reasons, means has been desired which can prevent data leakage even when the PC terminates illegally.

SUMMARY

Technical Problem

The present invention has been made in view of the above-mentioned problems, and an object thereof is to provide a data protection program which protects data to be processed by an application.

Solution to Problem

To accomplish the above-mentioned object, a data protection program product for protecting data to be processed by an application according to a first embodiment of the present invention causes a computer including volatile storage means and nonvolatile storage means to perform: a volatile file unpack function of writing, to the nonvolatile storage means, data corresponding to a data file to be read or written by an application so that the data is associated with the data file; and a volatile file repackage function of outputting the data file corresponding to the data written to the volatile storage means.

According to the configuration of the first embodiment of the present invention, the computer includes the volatile storage means and the nonvolatile storage means. Data corresponding to a data file read or written by an application is written to the volatile storage means so that the data is associated with the data file. The data file corresponding to the data written to the volatile storage means is outputted.

As a result, when the file is repackaged, a data file is obtained, and when the computer terminates illegally, the data written to the volatile storage means is deleted.

Hereafter, the data protection program according to the first embodiment of the present invention will be described. The first embodiment includes any of the following aspects and combinations of two or more thereof.

The data protection program product according to the first embodiment of the present invention causes the computer to further perform a volatile file read function of, when an application executes a file read routine for reading a data file from the nonvolatile storage means, reading the data associated with the data file from the volatile storage means so that the file read routine reads the data file corresponding to the data read from the volatile storage means.

According to the configuration of this embodiment, when an application executes a file read routine for reading a data file from the nonvolatile storage means, the data associated with the data file is read from the volatile storage means so that the file read routine reads the data file corresponding to the data read from the volatile storage means.

As a result, the application can process the data written to the volatile storage means.

The data protection program product according to the first embodiment of the present invention causes the computer to further perform a volatile file read function of, when an application executes a file read routine for reading a data file from the nonvolatile storage means, reading the data associated with the data file from the volatile storage means and replacing the data file to be read from the nonvolatile storage means by the file read routine with the data file corresponding to the data read from the volatile storage means so that the file read routine reads the data file corresponding to the data read from the volatile storage means.

According to the configuration of this embodiment, when an application executes a file read routine for reading a data file from the nonvolatile storage means, the data associated with the data file is read from the volatile storage means; and the data file to be read from the nonvolatile storage means by the file read routine is replaced with the data file corresponding to the data read from the volatile storage means so that the file read routine reads the data file corresponding to the data read from the volatile storage means.

As a result, the application can process the data written to the volatile storage means.

The data protection program product according to the first embodiment of the present invention causes the computer to further perform a volatile file write function of, when an application executes a file write routine for writing a data file corresponding to data to the nonvolatile storage means, writing the data to the volatile storage means so that the data is associated with the data file.

According to the configuration of this embodiment, when an application executes a file write routine for writing a data file corresponding to data to the nonvolatile storage means, the data is written to the volatile storage means so that the data is associated with the data file.

As a result, when the computer terminates illegally, the data written to the volatile storage means is deleted.

In the data protection program product according to the first embodiment of the present invention, the volatile file unpack function writes a temporary data file to the nonvolatile storage means, the temporary data file corresponding to temporary data, the temporary data differing from the data corresponding to the data file, and writes the data to the volatile storage means so that the data is associated with the temporary data file.

According to the configuration of this embodiment, temporary data file corresponding to temporary data differing from the data corresponding to the data file is written to the nonvolatile storage means. The data is written to the volatile storage means so that the data is associated with the temporary data file.

As a result, when the computer terminates illegally, the data written to the volatile storage means is deleted and the temporary data file is left in the nonvolatile storage means.

In the data protection program product according to the first embodiment of the present invention, when an application executes a file write routine for writing a data file corresponding to data to the nonvolatile storage means, the volatile file write function allows the file write routine to write the temporary data file to the nonvolatile storage means and writes the data to the volatile storage means so that the data is associated with the temporary data file.

According to the configuration of this embodiment, when an application executes a file write routine for writing a data file corresponding to data to the nonvolatile storage means, the temporary data file is written to the nonvolatile storage means by the file write routine. The data is written to the volatile storage means so that the data is associated with the temporary data file.

As a result, when the computer terminates illegally, the data written to the volatile storage means is deleted and the temporary data file is left in the nonvolatile storage means.

The data protection program product according to the first embodiment of the present invention causes the computer to further perform a volatile file write function of, when an application executes a file write routine for writing a data file corresponding to data to the nonvolatile storage means, replacing the data file to be written to the nonvolatile storage means by the file write routine with a temporary data file, the temporary data file corresponding to temporary data, the temporary data differing from the data corresponding to the data file so that the temporary data file write the temporary data file to the nonvolatile storage means, and writing the data to the volatile storage means so that the data is associated with the temporary data file.

According to the configuration of this embodiment, when an application executes a file write routine for writing a data file corresponding to data to the nonvolatile storage means, the data file to be written to the nonvolatile storage means by the file write routine is replaced with temporary data file, the temporary data file corresponding to temporary data file, the temporary data differing from data corresponding to the data file so that the file write routine writes the temporary data file to the nonvolatile storage means. The data is written to the volatile storage means so that the data is associated with the temporary data file.

As a result, when the computer terminates illegally, the data written to the volatile storage means is deleted and the temporary data file is left in the nonvolatile storage means.

In the data protection program product according to the first embodiment of the present invention, the volatile file unpack function decrypts an imported encrypted data file to create a data file and writes data corresponding to the created data file to the volatile storage means so that the data is associated with the data file.

According to the configuration of this embodiment, an imported encrypted data file is decrypted to create a data file. Data corresponding to the created data file is written to the volatile storage means so that the data is associated with the data file.

As a result, when the computer terminates illegally, the data is deleted.

In the data protection program product according to the first embodiment of the present invention, the temporary data is generated without being based on the data corresponding to the data file.

According to the configuration of this embodiment, the temporary data is generated without being based on the data corresponding to the data file.

As a result, the data cannot be estimated from the temporary data.

In the data protection program product according to the first embodiment of the present invention, the length of the temporary data and the length of the data corresponding to the data file are equal to each other.

According to the configuration of this embodiment, the length of the temporary data and the length of the data corresponding to the data file are equal to each other.

This makes it impossible to distinguish the temporary data file and the data file from each other using the data length.

To accomplish the above-mentioned object, a data protection program product for protecting data to be processed by an application according to a second embodiment of the present invention causes a computer including volatile storage means and nonvolatile storage means to perform: a volatile file write function of, when an application executes a file write routine for writing a data file corresponding to data to the nonvolatile storage means, writing the data to the volatile storage means so that the data is associated with the data file; and a volatile file repackage function of outputting the data file corresponding to the data written to the volatile storage means.

According to the configuration of the second embodiment of the present invention, the computer includes volatile storage means and nonvolatile storage means. When an application executes a file write routine for writing a data file corresponding to data to the nonvolatile storage means, the data is written to the volatile storage means so that the data is associated with the data file. The data file corresponding to the data written to the volatile storage means is outputted.

As a result, when the file is repackaged, an encrypted data file is obtained, and when the computer terminates illegally, the data written to the volatile storage means is deleted.

Hereafter, the data protection program product according to the second embodiment of the present invention will be described. The second embodiment includes any of the following aspects and combinations of two or more thereof.

The data protection program product according to the second embodiment of the present invention causes the computer to further perform a volatile file read function of, when an application executes a file read routine for reading a data file from the nonvolatile storage means, reading the data associated with the data file from the volatile storage means so that the file read routine reads the data file corresponding to the data read from the volatile storage means.

According to the configuration of this embodiment, when an application executes a file read routine for reading a data file from the nonvolatile storage means, the data associated with the data file is read from the volatile storage means so that the file read routine reads the data file corresponding to the data read from the volatile storage means.

As a result, the application can process the data written to the volatile storage means.

In the data protection program product according to the second embodiment of the present invention, when an application executes a file read routine for reading a data file from the nonvolatile storage means, the volatile file read function reads the data associated with the data file from the volatile storage means and replaces the data file to be read from the nonvolatile storage means by the file read routine with the data file corresponding to the data read from the volatile storage means so that the file read routine reads the data file corresponding to the data read from the volatile storage means.

According to the configuration of this embodiment, when an application executes a file read routine for reading a data file from the nonvolatile storage means, the data associated with the data file is read from the volatile storage means, and the data file to be read from the nonvolatile storage means by the file read routine is replaced with the data file corresponding to the data read from the volatile storage means so that the file read routine reads the data file corresponding to the data read from the volatile storage means.

As a result, the application can process the data written to the volatile storage means.

In the data protection program product according to the second embodiment of the present invention, when an application executes a file write routine for writing a data file corresponding to data to the nonvolatile storage means, the volatile file write function allows the file write routine to write temporary data file to the nonvolatile storage means, the temporary data file corresponding to the temporary data, the temporary data differing from data corresponding to the data file, and writes the data to the volatile storage means so that the data is associated with the temporary data file.

According to the configuration of this embodiment, when an application executes a file write routine for writing a data file corresponding to data to the nonvolatile storage means, the file write routine writes temporary data file to the nonvolatile storage means, the temporary data file corresponding to temporary data, the temporary data differing from the data corresponding to the data file. The data is written to the volatile storage means so that the data is associated with the temporary data file.

As a result, when the computer terminates illegally, the data written to the volatile storage means is deleted and the temporary data file is left in the nonvolatile storage means.

In the data protection program product according to the second embodiment of the present invention, when an application executes a file write routine for writing a data file corresponding to data to the nonvolatile storage means, the volatile file write function replaces the data file to be written to the nonvolatile storage means by the file write routine with the temporary data file so that the file write routine writes the temporary data file to the nonvolatile storage means, and writes the data to the volatile storage means so that the data is associated with the temporary data file.

According to the configuration of this embodiment, when an application executes a file write routine for writing a data file corresponding to data to the nonvolatile storage means, the data file to be written to the nonvolatile storage means by the file write routine is replaced with the temporary data file so that the file write routine writes the temporary data file to the nonvolatile storage means. The data is written to the volatile storage means so that the data is associated with the temporary data file.

As a result, when the computer terminates illegally, the data written to the volatile storage means is deleted and the temporary data file is left in the nonvolatile storage means.

In the data protection program product according to the second embodiment of the present invention, the temporary data is generated without being based on the data corresponding to the data file.

According to the configuration of this embodiment, the temporary data is generated without being based on the data corresponding to the data file.

As a result, the data cannot be estimated from the temporary data.

In the data protection program product according to the second embodiment of the present invention, the length of the temporary data and the length of the data corresponding to the data file are equal to each other.

According to the configuration of this embodiment, the length of the temporary data and the length of the data corresponding to the data file are equal to each other.

This makes it impossible to distinguish the temporary data file and the data file corresponding to the data from each other using the data length.

Advantageous Effects of Invention

As described above, the data protection programs according to the embodiments of the present invention have the following advantages owing to their configuration.

The data corresponding to the data file to be processed by the application is written to the volatile storage means, and the data written to the volatile storage means is outputted. Thus, when the file is repackaged, a data file is obtained, and when the computer terminates illegally, the data written to the volatile storage means is deleted.

When a file read routine is executed, the file read routine reads the data file from the volatile storage means. Thus, the application can process the data written to the volatile storage means.

When a file read routine is executed, the data to be read from the nonvolatile storage means is replaced with the data read from the volatile storage means so that the file read routine reads the data file from the volatile storage means. Thus, the application can process the data written to the volatile storage means.

When a file write routine is executed, the data is written to the volatile storage means. Thus, when the computer terminates illegally, the data written to the volatile storage means is deleted.

Further, the temporary data file is written to the nonvolatile storage means, and the data is written to the volatile storage means. Thus, when the computer terminates illegally, the data written to the volatile storage means is deleted, and the temporary data file is left in the nonvolatile storage means.

When a file write routine is executed, the temporary data file is written to the nonvolatile storage means, and the data is written to the volatile storage means. Thus, when the computer terminates illegally, the data written to the volatile storage means is deleted, and the temporary data file is left in the nonvolatile storage means.

When a file write routine is executed, the data file is replaced with the temporary data file, which is then written to the nonvolatile storage means, and the data is written to the volatile storage means. Thus, when the computer terminates illegally, the data written to the volatile storage means is deleted, and the temporary data file is left in the nonvolatile storage means.

Further, the data corresponding to the data file obtained by decrypting the imported encrypted data file is written to the volatile storage means. Thus, when the computer terminates illegally, the data is deleted.

Further, since the temporary data is generated without being based on the data, the data cannot be estimated from the temporary data.

Further, since the length of the temporary data and the length of the data are equal to each other, it is impossible to distinguish the temporary data file and the data file from each other using the data length.

When a file write routine is executed, the data is written to the volatile storage means, and the data written to the volatile storage means is outputted. Thus, when the file is repackaged, a data file is obtained, and when the computer terminates illegally, the data written to the volatile storage means is deleted.

When a file read routine is executed, the file read routine reads the data file from the volatile storage means. Thus, the application can process the data written to the volatile storage means.

When a file read routine is executed, the data to be read from the nonvolatile storage means is replaced with the data read from the volatile storage means so that the file read routine reads the data file from the volatile storage means. Thus, the application can process the data written to the volatile storage means.

When a file write routine is executed, the temporary data file is written to the nonvolatile storage means, and the data is written to the volatile storage means. Thus, when the computer terminates illegally, the data written to the volatile storage means is deleted, and the temporary data file is left in the nonvolatile storage means.

When a file write routine is executed, the data file is replaced with the temporary data file, which is then written to the nonvolatile storage means, and the data is written to the volatile storage means. Thus, when the computer terminates illegally, the data written to the volatile storage means is deleted, and the temporary data file is left in the nonvolatile storage means.

Further, since the temporary data is generated without being based on the data, the data cannot be estimated from the temporary data.

Further, since the length of the temporary data and the length of the data are equal to each other, it is impossible to distinguish the temporary data file and the data file from each other using the data length.

Accordingly, it is possible to provide a data protection program product for protecting data to be processed by an application.

DETAILED DESCRIPTION

Hereafter, embodiments of the present invention will be described with reference to the accompanying drawings.

Figure 1:
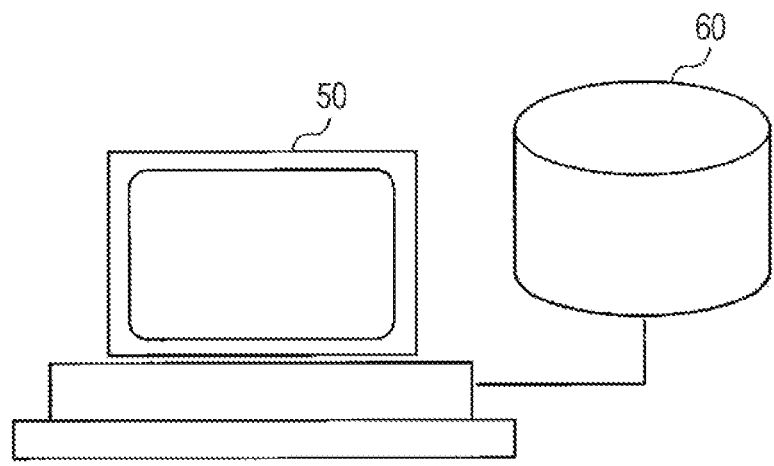
FIG. 1 is a conceptual view of a data protection apparatus according to an embodiment of the present invention.
Figure 2:
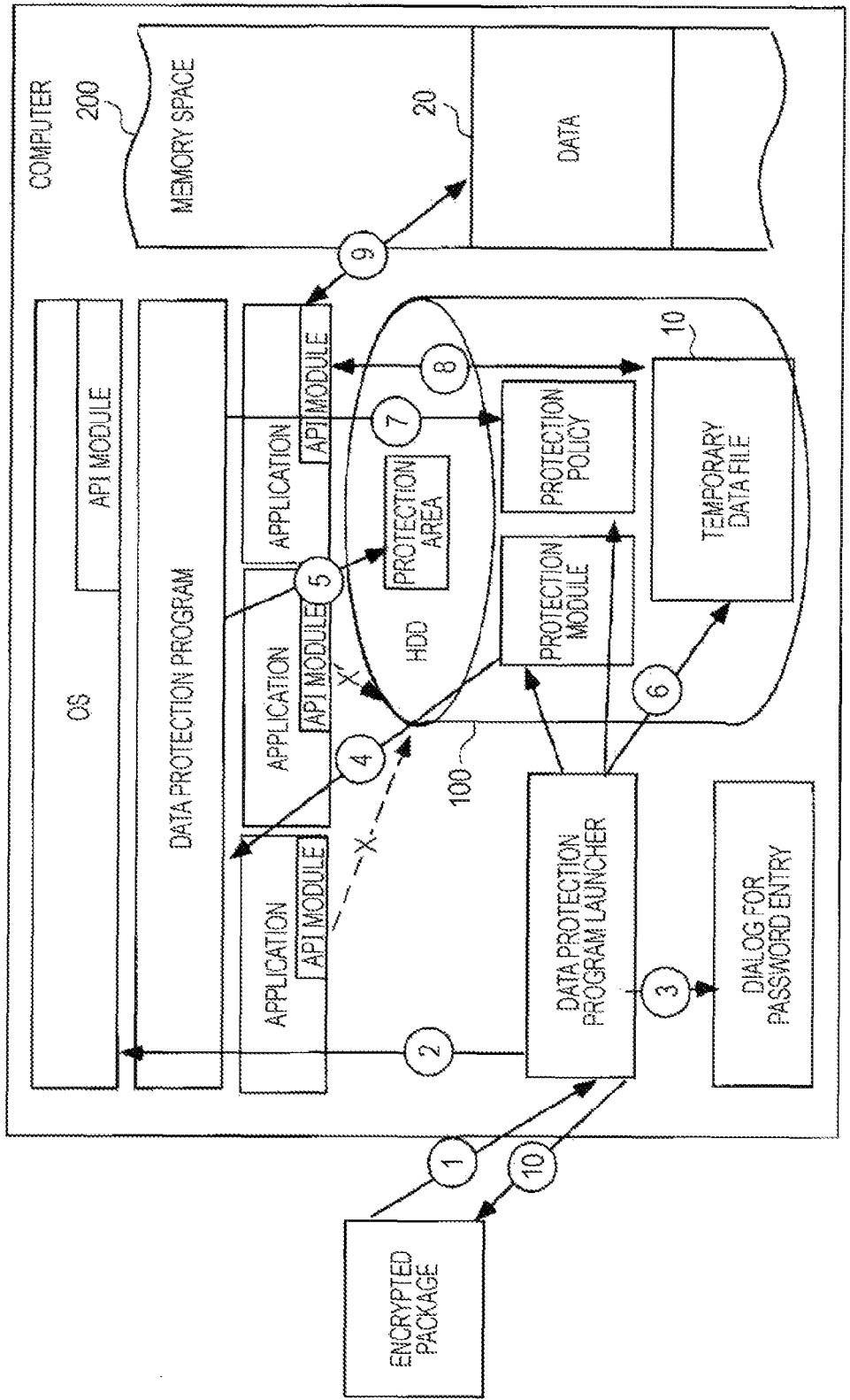
FIG. 2 is a first process diagram of a data protection program according to an embodiment of the present invention.
Figure 3:
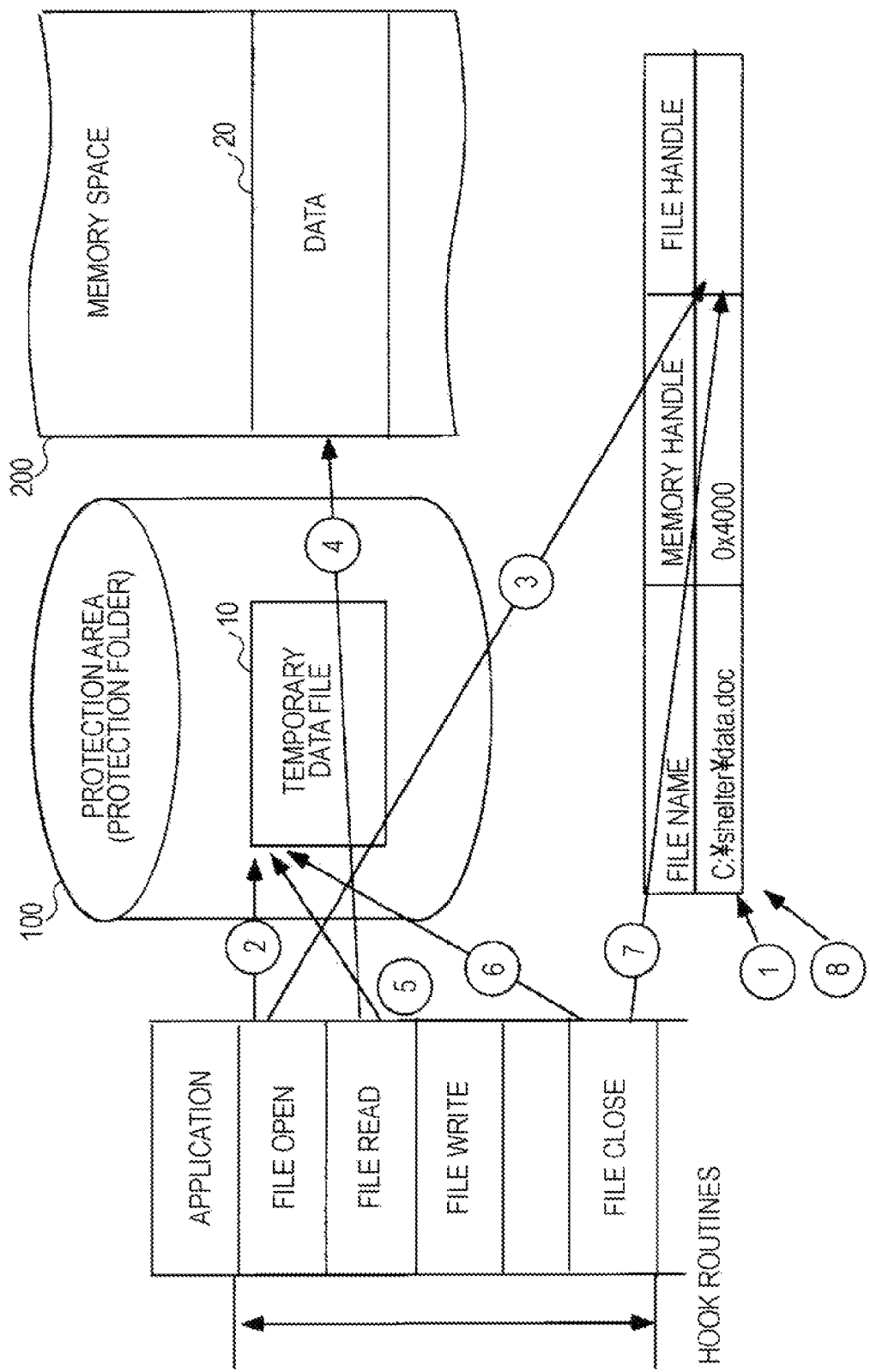
FIG. 3 is a second process diagram of the data protection program according to the embodiment of the present invention.
Figure 4:
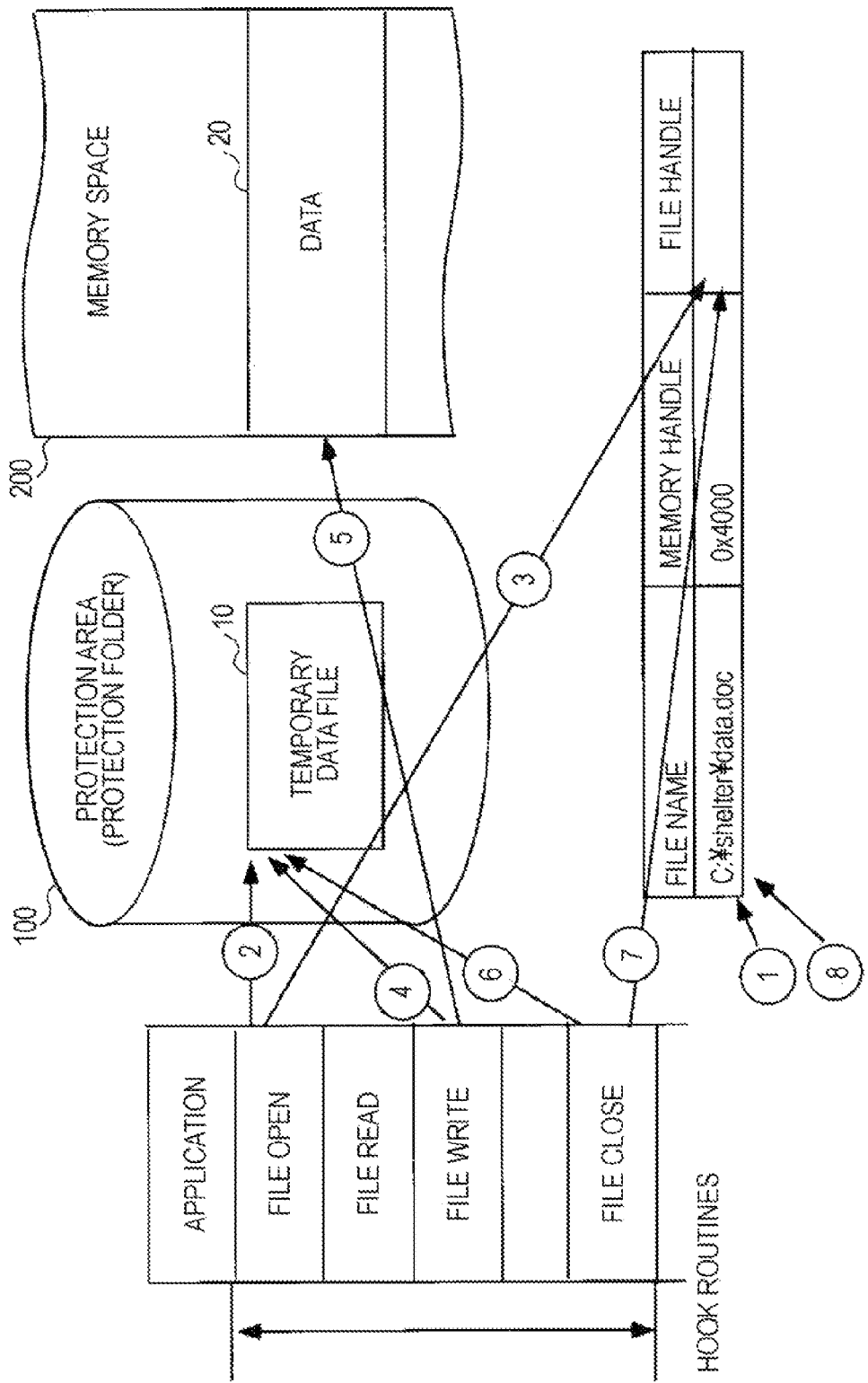
FIG. 4 is a third process diagram of the data protection program according to the embodiment of the present invention.
Figure 5:
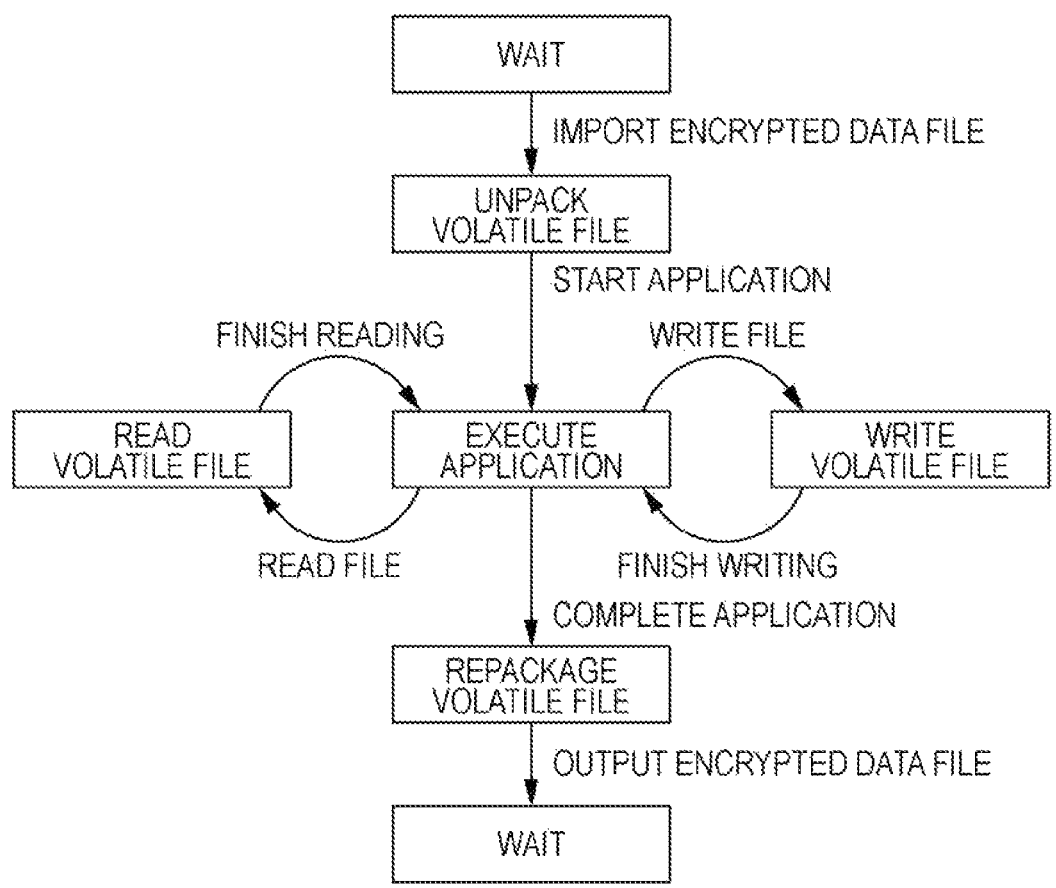
FIG. 5 is a state transition diagram of a data protection program according to a first embodiment of the present invention.
Figure 6:
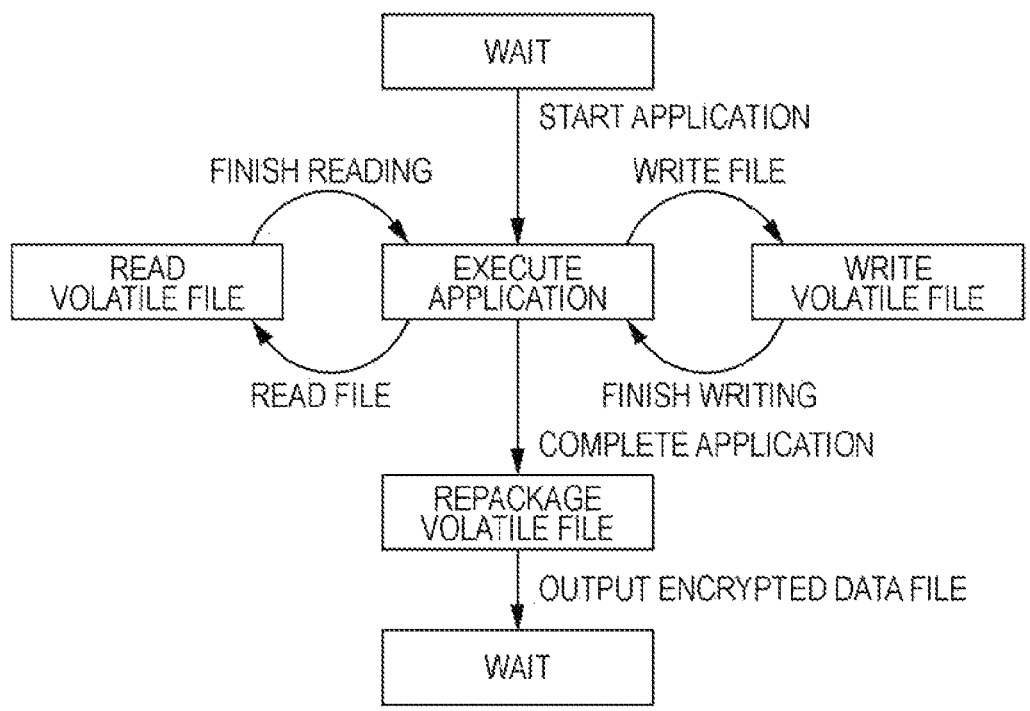
FIG. 6 is a state transition diagram of a data protection program according to a second embodiment of the present invention.

FIG. 1 is a conceptual view of a data protection apparatus according to an embodiment of the present invention. FIG. 2 is a first process diagram of a data protection program according to an embodiment of the present invention. FIG. 3 is a second process diagram of the data protection program according to the embodiment of the present invention. FIG. 4 is a third process diagram of the data protection program according to the embodiment of the present invention. FIG. 5 is a state transition diagram of a data protection program according to a first embodiment of the present invention. FIG. 6 is a state transition diagram of a data protection program according to a second embodiment of the present invention.

The data protection programs according to the embodiments of the present invention are intended to protect data to be processed by an application and cause a computer including volatile storage means 200 and nonvolatile storage means 100 to perform predetermined functions.

FIG. 1 shows the configuration of the computer.

The computer includes the volatile storage means 200 and the nonvolatile storage means 100 (see FIG. 2).

The volatile storage means 200 is hardware that stores data received while being supplied with electric power and that deletes the stored data when electric power is shut off.

The nonvolatile storage means 100 is hardware that stores data received while being supplied with electric power and that does not delete the stored data even when electric power is shut off.

The computer is composed of a computer main body 50 and a hard disk 60.

The volatile storage means 200 is, for example, an internal memory or the like of the computer.

The non-volatile storage unit 100 is, for example, a hard disk, magnetic storage device, magneto-optical storage device, nonvolatile memory, or the like.

Hereafter, the data protection program according to the first embodiment will be described with reference to the drawing.

The data protection program according to the first embodiment is intended to protect data to be processed by an application and causes the computer including the volatile storage means 200 and the nonvolatile storage means 100 to perform a volatile file unpack function and a volatile file repackage function.

Alternatively, the data protection program according to the first embodiment may cause the computer including the volatile storage means 200 and the nonvolatile storage means 100 to perform the volatile file unpack function, the volatile file repackage function, and a volatile file read function.

Alternatively, the data protection program according to the first embodiment may cause the computer including the volatile storage means 200 and the nonvolatile storage means 100 to perform the volatile file unpack function, the volatile file repackage function, and a volatile file write function.

Alternatively, the data protection program according to the first embodiment may cause the computer including the volatile storage means 200 and the nonvolatile storage means 100 to perform the volatile file unpack function, the volatile file repackage function, the volatile file read function, and the volatile file write function.

FIG. 5 shows state-transition aspects of the data protection program according to the first embodiment.

(Waiting)

The computer waits for input from an encrypted package.

When the computer imports an encrypted data file upon a click of the encrypted package, it moves to a volatile file unpack state.

(Unpacking Volatile File)

The volatile file unpack state is a state in which data is unpacked in a volatile file.

The computer performs the volatile file unpack function to import data from the encrypted package.

Upon completion of the volatile file unpack function, it moves to an application execution state.

(Executing Application)

The computer executes an application.

Upon reception of a file write instruction, the computer moves to a volatile file write state.

Upon reception of a file read instruction, the computer moves to a volatile file read state.

It completes the application and moves to a volatile file repackage state.

(Writing Volatile File)

The computer performs the volatile file write function to write data to be processed by the application to the volatile storage means 200.

Upon completion of the write, it moves to an application execution state.

(Reading Volatile File)

The computer performs the volatile file read function to transfer the data written to the volatile storage means 200 to the application.

Upon completion of the transfer, it moves to an application execution state.

(Repackaging in Volatile File)

The computer performs the volatile file repackage function to repackage the data written to the volatile storage means 200.

Upon completion of the repackaging, it moves to a waiting state.

The volatile file unpack function is a function of writing data corresponding to a data file to be read or written by an application to the volatile storage means 200 so that the data is associated with the data file.

Alternatively, the volatile file unpack function may decrypt an imported encrypted data file to create a data file and write data corresponding to the created data file to the volatile storage means 200 so that the data is associated with the created data file.

Alternatively, the volatile file unpack function may write temporary data file 10 to the nonvolatile storage means 100 and write data 20 to the volatile storage means 200 so that the data 20 is associated with the temporary data file 10. The temporary data file 10 is a data file corresponding to temporary data different from the data corresponding to the data file.

The temporary data corresponding to the temporary data file 10 may be the temporary data file 10 per se.

Alternatively, the temporary data corresponding to the temporary data file 10 may be a portion except for information required for file management, of the temporary data file 10. The information required for file management is, for example, file attribute information, flag information, icon information, log information, or the like. It varies depending on the operating system (OS).

The temporary data corresponding to the temporary data file 10 may be a group of multiple portions.

If the data file is an encrypted data file, the data corresponding to the data file may be data corresponding to a data file obtained by decrypting the encrypted data file.

The computer writes the data to the volatile storage means 200 so that the data is associated with the data file.

For example, the computer writes the data to the volatile storage means 200 so that the data is associated with information specific to the data file.

Alternatively, the computer writes the data to the volatile storage means 200 so that the data is associated with the name of the data file.

The file name is, for example, "C:\shelter\data.doc."

The temporary data file 10 is a data file corresponding to temporary data different from the data corresponding to the data file.

The temporary data file 10 is, for example, a data file obtained by encrypting the data file.

The temporary data may be generated without being based on the data corresponding to the data file.

The temporary data file 10 is, for example, "FF," "00," or other meaningless code representing information except for information used for file management, of the data file.

The length of the temporary data may be equal to the length of the data corresponding to the data file.

The length of the temporary data file 10 may be equal to the length of the data file.

For example, the temporary data file 10 is created by encrypting the data file to obtain an encrypted data file and adding "null" data to the encrypted data file so that the temporary data file 10 has a length equal to the length of the data file.

The volatile file repackage function is a function of outputting the data file corresponding to the data written to the volatile storage means 200.

The volatile file repackage function may encrypt the data file corresponding to the data written to the volatile storage means 200 and output the encrypted data file.

Where the data is a part of the data file, the volatile file repackage function may create a data file using the data written to the volatile storage means 200 and a portion of the temporary data file 10 except for the data thereof and output the created data file.

Where the data is a part of the data file, the volatile file repackage function may create a data file using the data written to the volatile storage means 200 and a portion of the temporary data file 10 except for the data thereof, encrypt the created data file, and output the encrypted data file.

The volatile file repackage function may delete the temporary data file 10 written to the nonvolatile storage means 100 and output the data file corresponding to the data written to the volatile storage means 200.

The volatile file repackage function may delete the temporary data file 10 written to the nonvolatile storage means 100 so that the temporary data file 10 cannot be restored and output the data file corresponding to the data written to the volatile storage means 200.

The volatile file read function is a function of, when a file read routine for reading a data file from the nonvolatile storage means 100 is executed by an application, reading the data associated with the data file from the volatile storage means 200 so that the file read routine reads the data file corresponding to the data read from the volatile storage means 200.

Alternatively, when a file read routine for reading a data file from the nonvolatile storage means 100 is executed by an application, the volatile file read function may read the data associated with the data file from the volatile storage means 200, and replace the data file to be read from the nonvolatile storage means 100 by the file read routine with the data file corresponding to the data read from the volatile storage means 200 so that the file read routine reads the data file corresponding to the data read from the volatile storage means 200.

The volatile file write function is a function of, when a file write routine for writing a data file corresponding to data to the nonvolatile storage means 100 is executed by an application, writing the data to the volatile storage means 200 so that the data is associated with the data file.

Alternatively, when a file write routine for writing a data file corresponding to data to the nonvolatile storage means 100 is executed by an application, the volatile file write function may allow the file write routine to write the temporary data file 10 to the nonvolatile storage means 100 and may write the data to the volatile storage means 200 so that the data is associated with the temporary data file 10. The temporary data file 10 is a data file corresponding to temporary data different from the data corresponding to the data file.

Alternatively, when a file write routine for writing a data file corresponding to data to the nonvolatile storage means 100 is executed by an application, the volatile file write function may replace the data file to be written to the nonvolatile storage means 100 by the file write routine with the temporary data file 10 so that the file write routine writes the temporary data file 10 to the nonvolatile storage means 100 and write the data to the volatile storage means 200 so that the data is associated with the temporary data file 10. The temporary data file 10 is a data file corresponding to temporary data different from the data corresponding to the data file.

The data is written to the volatile storage means 200 so that the data is associated with the data file.

The data may be written to the volatile storage means 200 so that the data is associated with information specific to the data file.

The data may be written to the volatile storage means 200 so that the data is associated with the name of the data file.

The data may be written to the volatile storage means 200 so that the data is associated with the temporary data file 10.

The data may be written to the volatile storage means 200 so that the data is associated with information specific to the temporary data file 10.

The data may be written to the volatile storage means 200 so that the data is associated with the name of the temporary data file 10.

Hereafter, a data protection program according to a second embodiment of the present invention will be described with reference to the drawings.

The data protection program according to the second embodiment is intended to protect data to be processed by an application and causes a computer including volatile storage means 200 and nonvolatile storage means 100 to perform a volatile file write function and a volatile file repackage function.

Alternatively, the data protection program according to the second embodiment may cause the computer including the volatile storage means 200 and the nonvolatile storage means 100 to perform the volatile file write function, the volatile file repackage function, and a volatile file read function.

FIG. 6 shows state transitions of the data protection program according to the second embodiment.

(Waiting)

The computer waits for an input from an encrypted package.

When the computer imports an encrypted data file upon a click of the encrypted package, it moves to an application execution state.

(Executing Application)

The computer executes an application.

Upon reception of a file write instruction, the computer moves to a volatile file write state.

Upon reception of a file read instruction, it moves to a volatile file read state.

The computer completes the application and moves to a volatile file repackage state.

(Writing Volatile File)

The computer performs the volatile file write function to write the data to be processed by the application to the volatile storage means 200.

Upon completion of the write, it moves to an application execution state.

(Reading from Volatile File)

The computer performs the volatile file read function to transfer the data written to the volatile storage means 200 to the application.

Upon completion of the transfer, it moves to an application execution state.

(Repackaging Volatile File)

The computer performs the volatile file repackage function to repackage the data written to the volatile storage means 200.

Upon completion of the repackaging, it moves to a waiting state.

The volatile file write function and the volatile file repackage function are the same as those in the data protection program according to the first embodiment and will not be described.

Hereafter, the functions will be described in detail using an example.

FIG. 2 shows the processes of the volatile file unpack function and the volatile file repackage function.

An example of the volatile file unpack function will be described with reference to the drawing.

Step (1)

The encrypted package is decrypted and imported by the personal computer.

A data protection program launcher is started by a click of the encrypted package.

The data protection program launcher is installed into the personal computer and executed.

Step (2)

The data protection program launcher acquires information specific to the personal computer.

Step (3)

A dialog appears and requires entry of a password.

When a password is entered, the personal computer determines whether the password is valid. If valid, it proceeds to step (4).

If not valid, the computer stops the execution.

Step (4)

The data protection program launcher defines a specific area of the hard disk as a protection area, decodes the modules of the data protection program, and introduces the decoded modules into the protection area as well as into the modules of the data protection program.

For example, the data protection program launcher defines a specific folder of the hard disk as a protection area, decodes the modules of the data protection program, and introduces the decoded modules into a specific folder as well as into the modules of the data protection program.

Step (5)

The data protection program launcher boots the modules of the data protection program and introduces the data protection program into all the applications to protect the folder defined as the protection area.

Step (6)

The data protection program launcher decrypts the policy of the data protection program and an encrypted data file of an application and unpacks the decrypted policy in the protection area and data file in the memory space.

The data protection program launcher then unpacks data 20 corresponding to the data file in the memory space so that the data 20 is associated with the name of the data file.

Step (7)

The data protection program introduced in the OS reads the policy of the data protection program.

Step (8)

Only a specified application can access temporary data file 10 present in the protection area.

The specified application cannot access temporary data file 10 present in a storage area other than the protection area.

Any unspecified application cannot access the data file 10 present in the protection area.

Step (9)

The data protection program can access the data written to the memory space.

An example of the volatile file repackage function will be described with reference to the drawing.

Step (10)

Upon completion of the application, the data protection program launcher creates a data file from the temporary data file 10 written to the protection area and the data written to the memory space, encrypts the data file, and outputs the encrypted data file to the package.

The data protection program launcher then deletes the temporary data file 10 written to the protection area and the data written to the memory space so that the temporary data file and the data cannot be restored.

Next, the volatile file read function will be described with reference to the drawing.

FIG. 3 is a second process diagram of the data protection program according to this embodiment.

Step (1)

When a volatile file is unpacked, temporary data file 10 is written to the protection area; data 20 is written to the memory space; and the temporary data file 10 and the data 20 are associated with each other.

An association table is created in which the name of the temporary data file 10 and the memory handle of the data 20 in the memory space are associated with each other.

The memory handle of the data 20 written to the memory space corresponds to the file handle of the temporary data file 10 written to the protection area.

Routines such as a file open routine, a file read routine, a file write routine, and a file close routine are hook routines into which the data protection program has been injected.

Step (2)

When a file has yet to be open, the application executes a file open routine.

The file open routine opens the temporary data file 10.

Step (3)

The file open routine additionally writes a file handle to the association table so that the file handle is associated with the file name.

Step (4)

The application executes the file read routine to read the data file from the protection area.

The volatile file read function reads the data associated with the data file from the volatile storage means 200 and replaces the data file to be read from the nonvolatile storage means 100 by the file read routine with the data file corresponding to the data read from the volatile storage means 200 so that the file read routine reads the data file corresponding to the data read from the volatile storage means 200.

Step (5)

The file write routine moves the file pointer.

Step (6)

The file close routine closes the temporary data file 10.

Step (7)

The file close routine deletes the file handle from the association table.

Step (8)

Upon completion of the application, the volatile file repackage function creates a data file on the basis of the temporary data file 10 written to the protection area and the data 20 written to the memory space, encrypts the data file to create an encrypted data file, and outputs the encrypted data file to the encrypted package.

The temporary data file 10 written to the protection area is deleted so that it cannot be restored.

The data 20 written to the memory space is also deleted so that it cannot be restored.

Next, the volatile file write function will be described with reference to the drawing.

FIG. 4 is a third process diagram of the data protection program according to this embodiment.

Step (1)

When a volatile file is unpacked, temporary data file 10 is written to the protection area; data 20 is written to the memory space; and the temporary data file 10 and the data 20 are associated with each other.

An association table is created in which the name of the temporary data file 10 and the memory handle of the data 20 in the memory space are associated with each other.

The memory handle of the data 20 written to the memory space corresponds to the file handle of the temporary data file 10 written to the protection area.

Routines such as a file open routine, a file read routine, a file write routine, and a file close routine are hook routines to which the data protection program has been injected.

Step (2)

When the file has yet to be open, the application executes the file open routine.

The file open routine opens the temporary data file 10.

Step (3)

The file open routine additionally writes a file handle to the association table so that the file handle is associated with the file name.

Step (4)

The application executes the file write routine to write the data file to the protection area.

The volatile file write function replaces the data file to be written to the nonvolatile storage means 100 by the file write routine with the temporary data file 10, which corresponds to temporary data different from data corresponding to the data file, so that the file write routine writes the temporary data file 10 to the protection area.

The volatile file write function writes the data 20 to the memory space so that the data 20 is associated with the file name, based on the memory handle.

Step (5)

The file write routine moves the file pointer.

Step (6)

The file close routine closes the temporary data file 10.

Step (7)

The file close routine deletes the file handle from the association table.

Step (8)

Upon completion of the application, the volatile file repackage function creates a data file on the basis of the temporary data file 10 written to the protection area and the data 20 written to the memory space, encrypts the data file, and outputs the encrypted data file to the encrypted package.

The temporary data file 10 written to the protection area is deleted so that it cannot be restored.

The data 20 written to the memory space is also deleted so that it cannot be restored.

The data protection program according to the first embodiment has the following advantages owing to its configuration.

The data 20 corresponding to the data file to be processed by the application is written to the volatile storage means 200, and the data file corresponding to the data 20 written to the volatile storage means 200 is encrypted and then outputted. Thus, when the file is repackaged, an encrypted data file is obtained, and when the computer terminates illegally, the data written to the volatile storage means 200 is deleted.

When a file read routine is executed, the file read routine reads the data file from the volatile storage means 200. Thus, the application can process the data 20 written to the volatile storage means 200.

When a file read routine is executed, the data to be read from the nonvolatile storage means 100 is replaced with the data 20 read from the volatile storage means 200 so that the file read routine reads the data file from the volatile storage means 200. Thus, the application can process the data written to the volatile storage means 200.

When a file write routine is executed, the data 20 is written to the volatile storage means 200. Thus, when the computer terminates illegally, the data 20 written to the volatile storage means 200 is deleted.

The temporary data file 10 is written to the nonvolatile storage means 100, and the data 20 is written to the volatile storage means 200. Thus, when the computer terminates illegally, the data 20 written to the volatile storage means 200 is deleted, and the temporary data file 10 is left in the nonvolatile storage means 100.

When a file write routine is executed, the temporary data file 10 is written to the nonvolatile storage means 100, and the data 20 is written to the volatile storage means 200. Thus, when the computer terminates illegally, the data 20 written to the volatile storage means 200 is deleted, and the temporary data file 10 is left in the nonvolatile storage means 100.

When a file write routine is executed, the data file is replaced with the temporary data file 10, which is then written to the nonvolatile storage means 100, and the data 20 is written to the volatile storage means 200. Thus, when the computer terminates illegally, the data 20 written to the volatile storage means 200 is deleted, and the temporary data file 10 is left in the nonvolatile storage means 100.

An imported encrypted data file is decrypted, and data corresponding to the decrypted data file is written to the volatile storage means 200. Thus, when the computer terminates illegally, the data 20 is deleted.

Since the temporary data is generated without being based on the data 20, the data 20 cannot be estimated from the temporary data.

Since the length of the temporary data and the length of the data 20 are equal to each other, it is impossible to distinguish the temporary data file 10 and the data file from each other using the data length.

According to the above-mentioned configuration, when the computer is rebooted after terminating illegally, the data file corresponding to the temporary data is present in the hard disk, and nothing is left in the memory space. Thus, there is no possibility that the data will leak out.

The data protection program according to the second embodiment has the following advantages owing to its configuration.

When a file write routine is executed, the data 20 is written to the volatile storage means 200, and the data file corresponding to the data 20 written to the volatile storage means 200 is encrypted and then outputted. Thus, when the file is repackaged, an encrypted data file is obtained, and when the computer terminates illegally, the data 20 written to the volatile storage means 200 is deleted.

When a file read routine is executed, the file read routine reads the data file from the volatile storage means 200. Thus, the application can process the data 20 written to the volatile storage means 200.

Alternatively, when a file read routine is executed, the data 20 to be read from the nonvolatile storage means 100 is replaced with the data 20 read from the volatile storage means 200 so that the file read routine reads the data file from the volatile storage means 200. Thus, the application can process the data 20 written to the volatile storage means 200.

When a file write routine is executed, the temporary data file 10 is written to the nonvolatile storage means 100, and the data 20 is written to the volatile storage means 200. Thus, when the computer terminates illegally, the data 20 written to the volatile storage means 200 is deleted, and the temporary data file 10 is left in the nonvolatile storage means 100.

Alternatively, when the file write routine is executed, the data file is replaced with the temporary data file 10, which is then written to the nonvolatile storage means 100, and the data 20 is written to the volatile storage means 200. Thus, when the computer terminates illegally, the data 20 written to the volatile storage means 200 is deleted, and the temporary data file 10 is left in the nonvolatile storage means 100.

Since the temporary data is generated without being based on the data, the data cannot be estimated from the temporary data.

Since the length of the temporary data and the length of the data are equal to each other, it is impossible to distinguish the temporary data file 10 and the data file from each other using the data length.

According to the above-mentioned configuration, when the computer is rebooted after terminating illegally, the data file corresponding to the temporary data is present in the hard disk, and nothing is left in the memory space. Thus, there is no possibility that the data will leak out.

The present invention is not limited to the above-mentioned embodiments, and various changes can be made to the embodiments without departing from the spirit of the invention.

While the description has been made assuming that the OS is Windows®, the OS is not limited thereto. The OS may be, e.g., Unix®, Mac OS®, or other Oss.

REFERENCE SIGNS LIST

10: temporary data file
20: data
50: computer main body
60: hard disk
100: nonvolatile storage means
200: volatile storage mean

CITATION LIST

Patent Literature

[PTL 1] Japanese Unexamined Patent Application Publication No. 2007-156865
[PTL 2] Japanese Unexamined Patent Application Publication No. 2006-344104

[PTL 3] Japanese Unexamined Patent Application Publication No. 2007-207102

What is claimed is:

1. A data protection program product for protecting data to be processed by an application, the data protection program product comprising a non-transitory machine readable storage medium having instructions stored thereon that are operable when executed for causing a computer including volatile storage device and nonvolatile storage device to perform:
   a volatile file write function of, responsive to the application executing a file write routine to write a data file associated with the data to the nonvolatile storage device, writing the data to the volatile storage device instead of the nonvolatile storage device so that the data written to the volatile storage device is associated with the data file;
   a volatile file read function of, responsive to the application executing a file read routine to read the data file from the nonvolatile storage device, reading the data associated with the data file from the volatile storage device; and
   a volatile file repackage function of outputting the data file associated with the data written to the volatile storage device, wherein responsive to the application executing the file read routine to read the data file from the nonvolatile storage device, the volatile file read function reads the data associated with the data file from the volatile storage device in lieu of the data file to be read from the nonvolatile storage device by the file read routine, and wherein responsive to the application executing the file write routine to write the data file associated with the data to the nonvolatile storage device, the volatile file write function allows the file write routine to write a temporary data file to the nonvolatile storage device and write the data to the volatile storage device so that the data is associated with the temporary data file.

2. The data protection program product according to claim 1, wherein responsive to the application executing the file write routine to write the data file associated with the data to the nonvolatile storage device, the volatile file write function replaces the data file to be written to the nonvolatile storage device by the file write routine with the temporary data file so that the file write routine writes the temporary data file to the nonvolatile storage device, and writes the data to the volatile storage device so that the data is associated with the temporary data file.

3. A data protection program product for protecting data to be processed by an application, the data protection program product comprising a non-transitory machine readable storage medium having instructions stored thereon that are operable when executed for causing a computer including volatile storage device and nonvolatile storage device to perform:
   a volatile file write function of, responsive to the application executing a file write routine to write a data file associated with the data to the nonvolatile storage device, writing the data to the volatile storage device instead of the nonvolatile storage device so that the data written to the volatile storage device is associated with the data file; and
   a volatile file repackage function of outputting the data file associated with the data written to the volatile storage device, wherein responsive to the application executing the file write routine to write the data file associated with the data to the nonvolatile storage device, the volatile file write function allows the file write routine to write a temporary data file to the nonvolatile storage device, the temporary data file associated with temporary data, the temporary data differing from the data associated with the data file, and writing the data to the volatile storage device so that the data is associated with the temporary data file.

4. A data protection program product for protecting data to be processed by an application, the data protection program product comprising a non-transitory machine readable storage medium having instructions stored thereon that are operable when executed for causing a computer including volatile storage device and nonvolatile storage device to perform:
   a volatile file write function of, responsive to the application executing a file write routine to write a data file associated with the data to the nonvolatile storage device, writing the data to the volatile storage device instead of the nonvolatile storage device so that the data written to the volatile storage device is associated with the data file; and
   a volatile file repackage function of outputting the data file associated with the data written to the volatile storage device, wherein responsive to the application executing the file write routine to write the data file associated with the data to the nonvolatile storage device, the volatile file write function replaces the data file to be written to the nonvolatile storage device by the file write routine with a temporary data file, the temporary data file associated with temporary data, the temporary data differing from the data associated with the data file, so that the file write routine writes the temporary data file to the nonvolatile storage device, and writes the data to the volatile storage device so that the data is associated with the temporary data file.

5. A data protection method for protecting data to be processed by an application, the data protection method comprising steps of:
   a volatile file write function, responsive to the application executing a file write routine to write a data file associated with the data to a nonvolatile storage device, writing the data to a volatile storage device instead of the nonvolatile storage device so that the data in the volatile storage device is associated with the data file;
   a volatile file read function, responsive to the application executing a file read routine to read the data file from the nonvolatile storage device, reading the data associated with the data file from the volatile storage device so that the file read routine reads the data file associated with the data read from the volatile storage device; and
   a volatile file repackage function outputting the data file associated with the data written to the volatile storage device, wherein responsive to the application executing the file read routine to read the data file from the nonvolatile storage device, the volatile file read function reads the data associated with the data file from the volatile storage device in lieu of the data file to be read from the nonvolatile storage device by the file read routine so that the file read routine reads the data file associated with the data read from the volatile storage device, and wherein responsive to the application executing the file write routine to write the data file associated with the data to the nonvolatile storage device, the volatile file write function allows the file write routine to write a temporary data file to the nonvolatile storage device and write the data to the volatile storage device so that the data is associated with the temporary data file.

6. The data protection method according to claim 5, wherein responsive to the application executing the file write routine to write the data file associated with the data to the nonvolatile storage device, the volatile file write function replaces the data file to be written to the nonvolatile storage device by the file write routine with the temporary data file so that the file write routine writes the temporary data file to the nonvolatile storage device, and writes the data to the volatile storage device so that the data is associated with the temporary data file.

7. A data protection method for protecting data to be processed by an application, the data protection method comprising steps of:
   a volatile file write function, responsive to the application executing a file write routine to write a data file associated with the data to a nonvolatile storage device, writing the data to a volatile storage device instead of the nonvolatile storage device so that the data in the volatile storage device is associated with the data file; and
   a volatile file repackage function outputting the data file associated with the data written to the volatile storage device, wherein responsive to the application executing the file write routine to write the data file associated with the data to the nonvolatile storage device, the volatile file write function allows the file write routine to write a temporary data file to the nonvolatile storage device, the temporary data file associated with temporary data, the temporary data differing from the data associated with the data file, and writing the data to the volatile storage device so that the data is associated with the temporary data file.

8. A data protection method for protecting data to be processed by an application, the data protection method comprising steps of:
   a volatile file write function, responsive to the application executing a file write routine to write a data file associated with the data to a nonvolatile storage device, writing the data to a volatile storage device instead of the nonvolatile storage device so that the data in the volatile storage device is associated with the data file; and
   a volatile file repackage function outputting the data file associated with the data written to the volatile storage device, wherein responsive to the application executing the file write routine to write the data file associated with the data to the nonvolatile storage device, the volatile file write function replaces the data file to be written to the nonvolatile storage device by the file write routine with a temporary data file, the temporary data file associated with temporary data, the temporary data differing from the data associated with the data file, so that the file write routine writes the temporary data file to the nonvolatile storage device, and writes the data to the volatile storage device so that the data is associated with the temporary data file.

* * * * *